United States Patent
Sibley (10) Patent No.: US 9,878,821 B2
(45) Date of Patent: Jan. 30, 2018

(54) CONTAINER FOR THE STORAGE, PRESERVATION, IDENTIFICATION, TRACKING AND TRANSPORT OF A FEDERALLY CONTROLLED SUBSTANCE

(71) Applicant: David P. Sibley, Twin Falls, ID (US)

(72) Inventor: David P. Sibley, Twin Falls, ID (US)

(73) Assignee: IDN2 Holdings, LLC, Twin Falls, ID (US)

( * ) Notice: Subject to any disclaimer, the term of this patent is extended or adjusted under 35 U.S.C. 154(b) by 64 days.

(21) Appl. No.: 14/519,031

(22) Filed: Oct. 20, 2014

(65) Prior Publication Data

US 2016/0107796 A1  Apr. 21, 2016

(51) Int. Cl.
| | |
|---|---|
| *B65D 81/28* | (2006.01) |
| *B65D 85/00* | (2006.01) |
| *B65B 31/00* | (2006.01) |
| *B65D 25/20* | (2006.01) |
| *B65B 61/20* | (2006.01) |
| *B65B 7/28* | (2006.01) |
| *B65D 25/14* | (2006.01) |
| *B65D 43/02* | (2006.01) |
| *B65D 81/20* | (2006.01) |
| *B65D 81/26* | (2006.01) |

(Continued)

(52) U.S. Cl.
CPC .............. *B65D 25/205* (2013.01); *B65B 7/28* (2013.01); *B65B 29/00* (2013.01); *B65B 31/00* (2013.01); *B65B 61/20* (2013.01); *B65D 17/163* (2013.01); *B65D 25/14* (2013.01); *B65D 43/0225* (2013.01); *B65D 51/18* (2013.01); *B65D 81/2069* (2013.01); *B65D 81/2076* (2013.01); *B65D 81/268* (2013.01); *B65D 85/70* (2013.01); *B65D 2203/06* (2013.01); *B65D 2203/10* (2013.01); *B65D 2203/12* (2013.01); *B65D 2251/0018* (2013.01); *B65D 2251/0071* (2013.01); *B65D 2517/0041* (2013.01)

(58) Field of Classification Search
CPC ...... B65D 25/14; B65D 29/00; B65D 81/268; B65D 85/12; B65D 17/163
USPC ....... 206/213.1, 242, 265, 236, 459.5, 524.8
See application file for complete search history.

(56) References Cited

U.S. PATENT DOCUMENTS

1,381,831 A * 6/1921 Heeren ................. B65D 25/14
                                                      206/264
3,281,008 A    10/1966  D'Andrea
(Continued)

*Primary Examiner* — Luan K Bui
(74) *Attorney, Agent, or Firm* — Richard D. Clarke (57) ABSTRACT

The present application provides a container for storage, preservation, identification, tracking and transport of a federally controlled substance comprising: (a) a one or more piece airtight container having an exterior surface and an interior surface, an upper portion and a lower portion, configured for containing a federally controlled substance; (b) an inner coating liner lining said interior surface of said airtight container; (c) a one piece tamper resistant easy open lid affixed to said upper portion of said airtight container; and (d) identifying indicia located on the exterior surface for identifying the contained federally controlled substance contents within said container; wherein said airtight container configured for containing a federally controlled substance, has the atmosphere evacuated and the container filled with an inert gas before the airtight container is hermetically sealed, containing a federally controlled substance inside.

18 Claims, 7 Drawing Sheets

(51) Int. Cl.
    *B65D 17/00*     (2006.01)
    *B65D 51/18*     (2006.01)
    *B65B 29/00*     (2006.01)

(56) References Cited

U.S. PATENT DOCUMENTS

| | | | | |
|---|---|---|---|---|
| 4,883,198 | A * | 11/1989 | Manska | B65D 51/1677 |
| | | | | 220/231 |
| 4,960,206 | A * | 10/1990 | Johannes | B65D 55/028 |
| | | | | 206/459.1 |
| 5,402,906 | A * | 4/1995 | Brown | B65B 25/041 |
| | | | | 206/524.8 |
| 5,961,000 | A | 10/1999 | Sanfilippo et al. | |
| 7,798,319 | B1 * | 9/2010 | Bried | A24F 23/00 |
| | | | | 131/352 |
| 2005/0173272 | A1 * | 8/2005 | Lemmons, IV | A24F 23/00 |
| | | | | 206/256 |
| 2010/0101186 | A1 * | 4/2010 | Cronin | B65D 21/08 |
| | | | | 53/436 |
| 2011/0174639 | A1 * | 7/2011 | Sibley | F42B 39/22 |
| | | | | 206/3 |
| 2011/0303566 | A1 * | 12/2011 | Gibson | A24F 23/00 |
| | | | | 206/246 |
| 2012/0061263 | A1 * | 3/2012 | Sibley | B65B 61/20 |
| | | | | 206/213.1 |

* cited by examiner

CONTAINER FOR THE STORAGE, PRESERVATION, IDENTIFICATION, TRACKING AND TRANSPORT OF A FEDERALLY CONTROLLED SUBSTANCE

This is a CIP of application Ser. No. 13/233,931, filed on Sep. 15, 2011, now U.S. Pat. No. 8,863,947.

FIELD OF THE INVENTION

This application provides a unique container for storing, preserving, identifying, tracking and transporting a federally controlled substance and a canning process for federally controlled substances where the cans enamel lined, atmosphere evacuated, inert gas filled, and hermetically sealed, and the federally controlled substance contents are clearly identified in a number of different ways. In particular, the federally controlled substance containers are optimized for long term storage and can be readily detected, tracked and traced when filled with a federally controlled substance.

A controlled substance is generally a drug or chemical whose manufacture, possession, or use is regulated by a government. Controlled substances are substances that are the subject of legislative control. This may include illegal drugs and prescription medications. In the United States for example, the Controlled Substances Act (or CSA) was passed by the 91$^{st}$ US Congress as Title II of the Comprehensive Drug Abuse Prevention and Control Act of 1970 and signed into law by President Richard Nixon. The CSA is the federal US drug policy under which the manufacture, importation, possession, use and distribution of controlled substances is regulated. In the US, the Drug Enforcement Administration (DEA) is responsible for suppressing illegal drug use and distribution by enforcing the Controlled Substances Act.

Section 812 of the Controlled Substances Act (21 U.S.C. §801 et seq.) (CSA) lists substances which were controlled in 1970 when the law was enacted. Since then, approximately 160 substances have been added, removed, or transferred from one schedule to another. The current official list of controlled substances can be found in section 1308 of the most recent issue of Title 21 Code of Federal Regulations (CFR) Part 1300 to end (21 CFR §1308) and the final rules which were published in the Federal Register subsequent to the issuance of the CFR. The Appendix attached to this patent application is a full listing of all of the federally Controlled Substances defined by the DEA, as of September 2014.

This list describes the basic or parent chemical and do not describe the salts, isomers and salts of isomers, esters, ethers and derivatives which may be controlled substances. These lists are intended as general references and are not comprehensive listings of all controlled substances. Please note that a substance need not be listed as a controlled substance to be treated as a Schedule I substance for criminal prosecution. A controlled substance analogue is a substance which is intended for human consumption and is structurally or pharmacologically substantially similar to or is represented as being similar to a Schedule I or Schedule II substance and is not an approved medication in the United States. (See 21 U.S.C. §802(32)(A) for the definition of a controlled substance analogue and 21 U.S.C. §813 for the schedule).

Drugs, substances, and certain chemicals used to make drugs are classified into five (5) distinct categories or schedules depending upon the drug's acceptable medical use and the drug's abuse or dependency potential. The abuse rate is a determinate factor in the scheduling of the drug for example, Schedule I drugs are considered the most dangerous class of drugs with a high potential for abuse and potentially severe psychological and/or physical dependence. As the drug schedule changes—Schedule II, Schedule III, etc., so does the abuse potential—Schedule V drugs represents the least potential for abuse. A Listing of drugs and their schedule are located at Controlled Substance Act (CSA) Scheduling or CSA Scheduling by Alphabetical Order. These lists describe the basic or parent chemical and do not necessarily describe the salts, isomers and salts of isomers, esters, ethers and derivatives which may also be classified as controlled substances. These lists are intended as general references and are not comprehensive listings of all controlled substances.

Note that a substance need not be listed as a controlled substance to be treated as a Schedule I substance for criminal prosecution. A controlled substance analogue is a substance which is intended for human consumption and is structurally or pharmacologically substantially similar to or is represented as being similar to a Schedule I or Schedule II substance and is not an approved medication in the United States. (See 21 U.S.C. §802(32)(A) for the definition of a controlled substance analogue and 21 U.S.C. §813 for the schedule).

Schedule I

Schedule I drugs, substances, or chemicals are defined as drugs with no currently accepted medical use and a high potential for abuse. Schedule I drugs are the most dangerous drugs of all the drug schedules with potentially severe psychological or physical dependence. Some examples of Schedule I drugs are: heroin, lysergic acid diethylamide (LSD), marijuana (cannabis), 3,4-methylenedioxymethamphetamine (ecstasy), methaqualone and peyote.

Schedule II

Schedule II drugs, substances, or chemicals are defined as drugs with a high potential for abuse, less abuse potential than Schedule I drugs, with use potentially leading to severe psychological or physical dependence. These drugs are also considered dangerous. Some examples of Schedule II drugs are: cocaine, methamphetamine, methadone, hydromorphone (Dilaudid), meperidine (Demerol), oxycodone (OxyContin), fentanyl, Dexedrine, Adderall, and Ritalin.

Schedule III

Schedule III drugs, substances, or chemicals are defined as drugs with a moderate to low potential for physical and psychological dependence. Schedule III drugs abuse potential is less than Schedule I and Schedule II drugs but more than Schedule IV. Some examples of Schedule III drugs are: Combination products with less than 15 milligrams of hydrocodone per dosage unit (Vicodin), Products containing less than 90 milligrams of codeine per dosage unit (Tylenol with codeine), ketamine, anabolic steroids, and testosterone.

Schedule IV

Schedule IV drugs, substances, or chemicals are defined as drugs with a low potential for abuse and low risk of dependence. Some examples of Schedule IV drugs are: Xanax, Soma, Darvon, Darvocet, Valium, Ativan, Talwin, and Ambien.

Schedule V

Schedule V drugs, substances, or chemicals are defined as drugs with lower potential for abuse than Schedule IV and consist of preparations containing limited quantities of certain narcotics. Schedule V drugs are generally used for antidiarrheal, antitussive, and analgesic purposes. Some examples of Schedule V drugs are: cough preparations with less than 200 milligrams of codeine or per 100 milliliters (Robitussin AC), Lomotil, Motofen, Lydon, and Parepectolin.

The transport and sales of federally controlled substances, hereinafter simply referred to as "controlled substances," has generally in the past been handled through pharmaceutical suppliers but with several states looking at the legalized sales of products like Marijuana there is a great need to identify, control, track and document these sales.

Containers carrying controlled substances should be readily identifiable both by sight and odor. Dogs are often used to locate these items, but if they are sealed where the air and moisture in the container is replaced with an inert gas along with a dehumidifying agents before sealing, dogs might not be able to locate these items. Identifying odor materials can be attached directly to the outside of the container or to the label. There are other various ways to identify these containers like colorization of the containers and their labels, bar coding and microchips either on the inside or affixed to the outside.

Problems will definitely arise from the transport of these materials from a state that legalizes it to a state where its possession is still illegal. Clearly identifying these containers will help to alleviate some of these problems. If states that legalize the sales of controlled substances like Marijuana would stipulate that it is only to be sold in an identifiable sealed container, there could be a greater control of its propagation, sales and the state taxes paid. With the legalization and controlled sales, the price would come down so that it would not be profitable for the illegal growing of the products.

Numerous innovations for pharmaceutical products have been provided in the prior art that are described as follows. Even though these innovations may be suitable for the specific individual purposes to which they address, they differ from the present design as hereinafter contrasted. The following is a summary of those prior art patents most relevant to this application at hand; as well as a description outlining the difference between the features of the canning process of controlled substances and the prior art.

U.S. Pat. No. 5,135,144 of David C. Blakley describes a belt worn and readily portable medical supply pouch for holding a supply of drug containers in a temperature stable and contamination resistant environment is disclosed. A substantially rectangular housing fabricated from a thick insulating material comprising a bottom, two side panels, a front and a back panel with an open top. A housing thus formed defines a cavity therein for storing a supply of drug cartridges. A protective panel extending across the opening of the housing and angled downward into the cavity is provided to prevent contamination from entering the cavity, while providing access by the hand of a user through the opening and down into the cavity for retrieving one of the drug containers. The housing is covered inside and out by a water-proof and contamination-resistant nylon material. Two belt loop members are affixed to the back panel of the housing for attaching the pouch to the waist belt of a user. An internal pocket inside the cavity of the housing is provided for containing a heating element for heating the interior cavity. An outside auxiliary pocket is attached to the outside surface of the front panel for storing items not requiring an insulated and contamination free environment.

This patent describes a belt worn and readily portable medical supply pouch for holding a supply of drug containers. It does not describe a single sealed container for a controlled substance like Marijuana.

U.S. Pat. No. 5,836,474 Georan Wessberg tells of an invention that relates to a medicament storage device which includes a storage plate having a plurality of storage spaces for storing quantities, such as medicament dosages and a base unit which has a memory and an alarm function. The device is characterized in that the openings of respective storage spaces are provided with a closure means in the form of a long and a short flap which overlap one another and which are either spring mounted or consist of elastic material. The flap overlap regions include indicating means which illustrate in which direction passage has occurred through the opening and/or with detecting means which produce a signal relating to the direction of the last passage through the opening.

This patent tells of an invention that relates to a medicament storage device which includes a storage plate having a plurality of storage spaces for storing quantities, such as medicament dosages. It again does not describe a single sealed container for a controlled substance like Marijuana.

U.S. Pat. No. 5,866,219 of Paul McClure et al relates to a product information label system having a base member and a foldout medical information pamphlet which is applied to medicinal and drug containers where the foldout pamphlet is resealable for subsequent use.

This patent relates to a product information label system and does not deal with any form of containment means.

U.S. Pat. No. 6,793,081 Jay S. Denman describes a locking neck ring device that is placed over a capped bottle or container and grips the bottle neck ring, and together with a padlock or other securing means, prevents access to the bottle cap. The locking device comprises a clamp member that jackets a capped bottle neck; a cover which fits over the clamp member causing it to clamp on to the neck below the neck ring, and means to hold the clamp member to the cover. Provision is made for attaching a padlock or other securing means which holds the locking ring device in place. The bottle or container cap can then not be accessed for removal. The device is applicable to all sizes of drug containers, wine and liquor bottles for effectively locking access to the container contents.

This patent describes a locking neck ring device that is placed over a capped bottle or container and grips the bottle neck ring. It does not with any specific containment means.

None of these previous efforts, however, provides the benefits attendant with the process of canning a controlled substance and do not mention the use of an inert gas as a means of providing long-term storage. The present process of canning a controlled substance achieves its intended purposes, objects and advantages over the prior art through a new useful and unobvious combination of method steps and component elements at a reasonable cost and by employing readily available materials.

In this respect, before explaining at least one embodiment of the canning a controlled substance in detail it is to be understood that the process is not limited to just a specific process set forth in the following description or illustrated in the drawings. The canning process of controlled substances is capable of having other embodiments and of being applied in various ways. In addition, it is to be understood that the phraseology and terminology employed herein are for the purpose of description and should not be regarded as limiting. As such, those skilled in the art will appreciate that the conception, upon which this disclosure is based, may readily be utilized as a basis for creating other processes for carrying out the several purposes of the present application. It is important, therefore, that the claims be regarded as including such equivalent construction insofar as they do not depart from the spirit and scope of the present application.

SUMMARY OF THE INVENTION

The principal advantage of the container and process for the storage, preservation, identification, tracking and transport of a federally controlled substance is to control the identification, movement and tracking of the federally controlled substance products.

Another advantage of the container and process for the storage, preservation, identification, tracking and transport of a federally controlled substance is to control the propagation and processing of the federally controlled substance products.

Another advantage of the container and process for the storage, preservation, identification, tracking and transport of a federally controlled substance is to control the sale and collection of sales taxes from the sale of the federally controlled substance products.

Another advantage of the container and process for the storage, preservation, identification, tracking and transport of a federally controlled substance is the option of the removal of the oxygen and moisture while keeping the substance stored in an inert gaseous atmosphere.

Another advantage of the container and process for the storage, preservation, identification, tracking and transport of a federally controlled substance is that with an external odor substance, dogs will be able to locate it.

Another advantage of the container and process for the storage, preservation, identification, tracking and transport of a federally controlled substance is that they can have a micro-chip on the inside or outside for product locating.

Another advantage of the container and process for the storage, preservation, identification, tracking and transport of a federally controlled substance is that they can have a bar code on the outside for product identification.

Another advantage in the container and process for the storage, preservation, identification, tracking and transport of a federally controlled substance is that a variety of different packing and dehumidifying materials can be used, including formed rice cakes.

Another advantage is when formed rice cakes are used in the container and process for the storage, preservation, identification, tracking and transport of a federally controlled substance as a packing and dehumidifying agent, they can be readily and easily disposed of and are recyclable eco-friendly materials.

Another advantage of the container and process for the storage, preservation, identification, tracking and transport of a federally controlled substance is that an inexpensive form container can be made in different sizes and shapes, including cans, plastic pails, etc.

Yet another advantage of the container and process for the storage, preservation, identification, tracking and transport of a federally controlled substance is it can use a variety of different inert gases in the manufacturing process if desired, including nitrogen, etc.

These together with other advantages in the container and process for the storage, preservation, identification, tracking and transport of a federally controlled substance, along with the various features of novelty, which characterize the process, are pointed out with particularity in the claims annexed to and forming a part of this disclosure. For a better understanding of the container and process for the storage, preservation, identification, tracking and transport of a federally controlled substance and its operating advantages and the specific objects attained by its uses, reference should be made to the accompanying drawings and descriptive matter in which there are illustrated preferred and alternate embodiments of the container and process for the storage, preservation, identification, tracking and transport of a federally controlled substance. There has thus been outlined, rather broadly, the more important features of the container and process for the storage, preservation, identification, tracking and transport of a federally controlled substance in order that the detailed description there of that follows may be better understood, and in order that the present contribution to the art may be better appreciated. There are additional features of the container and process for the storage, preservation, identification, tracking and transport of a federally controlled substance that will be described hereinafter and which will form the subject matter of the claims appended hereto.

The preferred embodiment of container and process for the storage, preservation, identification, tracking and transport of a federally controlled substance will be placing the controlled substance into the preformed metal container with an enameled surface on the inside and outside. The process will begin by inserting a packing and dehumidifying agent, preferably a formed rice cake. If a microchip is desired within the container it is put in before inserting the controlled substance. The controlled substance is then inserted with a second preformed rice cake on the top. In some cases the rice cakes will be eliminated or just a single rice cake will be used on the top or the bottom. All of the different configurations of containing the controlled substance with rice cakes will be covered within the scope of this application.

If the container and process for the storage, preservation, identification, tracking and transport of a federally controlled substance in an inert atmosphere is desired the container is placed into a vacuum chamber. The chamber doors are closed and a vacuum of approximately 26-29 inches of mercury is drawn on the chamber. This removes all of the atmosphere/oxygen and atmospheric moisture that may be present. The vacuum is then halted and the chamber is then flooded with gaseous nitrogen. The gas is inert and dry, creating a benign atmosphere inside the container and around the controlled substance. This dry, inert environment now created inside the container will halt the degradation of the controlled substance. The shelf life/storage time created by this process should give the controlled substance stored inside the container almost an unlimited life regardless of the environment outside the container. This application is not limited to gaseous nitrogen. Alternate methods can include liquid nitrogen, oxygen absorbers along with other inert gases such as carbon dioxide, helium, and argon. Any process used to create an inert/benign atmosphere while canning the controlled substances will be covered within the scope of this application.

After the evacuation/flooding process is complete the chamber doors are opened and the container, filled with nitrogen, is pushed out and immediately put through the conventional canning process. The nitrogen gas that is in the container at this time is very heavy, dense, and cold and is not naturally trying to diffuse into the air in the room allowing for a reasonable amount of time to apply a lid and seal the container. An alternate method of packaging would be to put the prepackaged controlled substance in a sealable plastic bag filled with nitrogen and place it within the container.

After the container has been sealed in the conventional pop-top canning procedure an identifying scent substance is permanently adhered to the can or label. If an external microchip is desired it can be adhered to the outside of the can or be incorporated into a plastic removable locking ring around the top of the can. The label can also have an identifying bar code imprinted on it or the bar code can be printed on the can.

An alternate embodiment of the of the container and process for the storage, preservation, identification, tracking and transport of a federally controlled substance would be the use of a polymer round pail type of container having a lid that screws on with a ratcheting locking mechanism and an O-ring seal. Once the polymer round pail has been filled, a cushioning and dehumidifying element such as a formed rice cake is placed on top of the substance. If the process of storing the controlled substance in an inert atmosphere is desired it is that placed into a vacuum chamber. The chamber doors are closed and a vacuum of approximately 26-29 inches of mercury is drawn on the chamber removing all of the atmosphere/oxygen and atmospheric moisture that may be present. The vacuum is then halted and the chamber is then flooded with gaseous nitrogen. The gas is inert and dry, creating a benign atmosphere inside the container and around the product. This dry, inert environment now created inside the container will halt degradation of the controlled substance. This application is not limited to gaseous nitrogen. Alternate methods can include liquid nitrogen, oxygen absorbers along with other inert gases such as carbon dioxide, helium, and argon. Any process used to create an inert/benign atmosphere inside the container will be covered within the scope of this application. Additional sealing will include a foil membrane attached over the top edge of the container with an O-ring in the lid making the final sealing means.

Additionally, a stand-alone container and process for the storage, preservation, identification, tracking and transport of a federally controlled substance is disclosed herein for the storage and preservation of marijuana "trim" while it is collected and before it is processed to extract the active compound Tetrahydrocannabinols or THC. When Marijuana is propagated the plants are often trimmed resulting in cuttings (scraps) of Marijuana plants known as "trim." In this embodiment, a container is used having an openable/closeable lid and the container is in communication with a vacuum pump and a nitrogen (or other inert gas) compressed tank storage. The "trim" is collected each day then stored in the specialized container under a vacuum and/or after being flooded with inert gas. This keeps the trim fresh over the relatively long collection times before processing the trim to extract the THC therein.

Furthermore, in the process of canning the controlled substances for maximized preservation the oxygen is removed from the container during the process in one of four ways: (1) injection into the container of inert gas before sealing the container; (2) flooding the container with inert gas before sealing the container; (3) passing the container under a free flowing stream of inert gas before sealing the container; and (4) addition of an oxygen absorber packet into the container before sealing the container.

With respect to the above description then, it is to be realized that the optimum dimensional relationships for the parts of this application, to include variations in size, materials, shape, form, function and manner of operation, assembly and use, are deemed readily apparent and obvious to one skilled in the art. All equivalent relationships to those illustrated in the drawings and described in the specification intend to be encompassed by the present disclosure. Therefore, the foregoing is considered as illustrative only of the principles of the container and process for the storage, preservation, identification, tracking and transport of a federally controlled substance. Further, since numerous modifications and changes will readily occur to those skilled in the art, it is not desired to limit the design to the exact construction and operation shown and described, and accordingly, all suitable modifications and equivalents may be resorted to, falling within the scope of this application.

BRIEF DESCRIPTION OF THE DRAWINGS

The accompanying drawings, which are incorporated in and form a part of this specification, illustrate embodiments of the process of canning a controlled substance and together with the description, serve to explain the principles of this application.

For a fuller understanding of the nature and advantages of the container and process for the storage, preservation, identification, tracking and transport of a federally controlled substance, reference should be had to the following detailed description taken in conjunction with the accompanying drawings which are incorporated in and form a part of this specification, illustrate embodiments of the process together with the description, serve to explain the principles of this application.

DETAILED DESCRIPTION OF THE PREFERRED EMBODIMENTS

Figure 1:
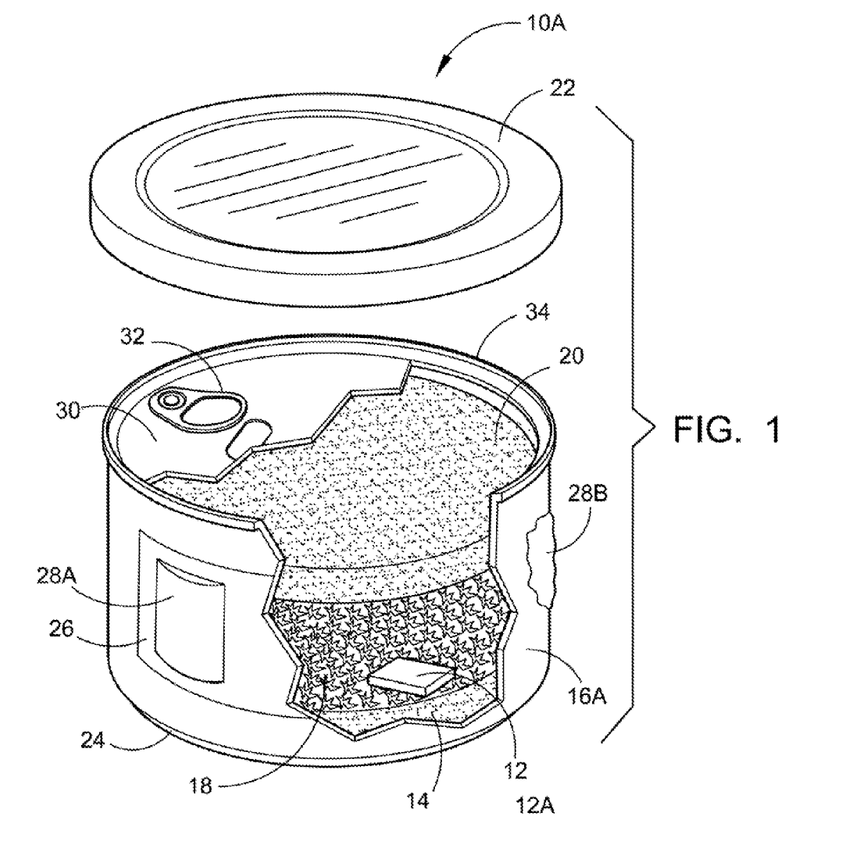
FIG. 1 depicts a perspective view of a tamper-resistant easy open container configured to contain a controlled substance and enable identification of the internal contents of such container cut away illustrating a microchip on the preformed rice cake on the bottom of the can with the controlled substance between a second preformed rice cake with the plastic lid raised above.

Referring now to the drawings, wherein similar parts of the process of canning a controlled substance is illustrated there is seen in FIG. 1 a perspective view of a conventional pop-top can assembly 10A cut away illustrating the internal microchip 12A on the lower preformed rice cake 14 at the bottom of the container 16A. The controlled substance 18 is between the upper preformed rice cake 20 and lower preformed rice cake 14 with the plastic lid 22 above the container 16A. The container 16A will consist of a conventional pressed formed metal can without a crimped edge on the container bottom edge 24. The container 16A will have a label 26 where an external odor substance 28A can be located, or the external odor substance 28B can be adhered to the outside surface of the container 16A. The process of storing the controlled substance in an inert atmosphere is optional at this time. A tamper resistant easy open lid 30, possibly configured in any of numerous configurations, here shown as a pop-top lid with an opening tab 32, which will be sealed to the container top edge 34 of container 16A.

Figure 2:
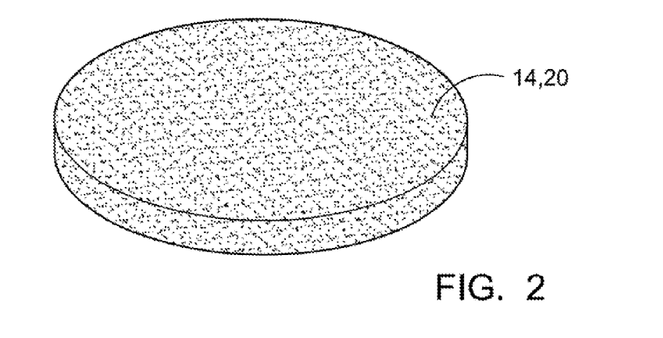
FIG. 2 depicts a perspective view of a preformed rice cake.

FIG. 2 depicts a perspective view of a preformed rice cake 14, 20.

Figure 3:
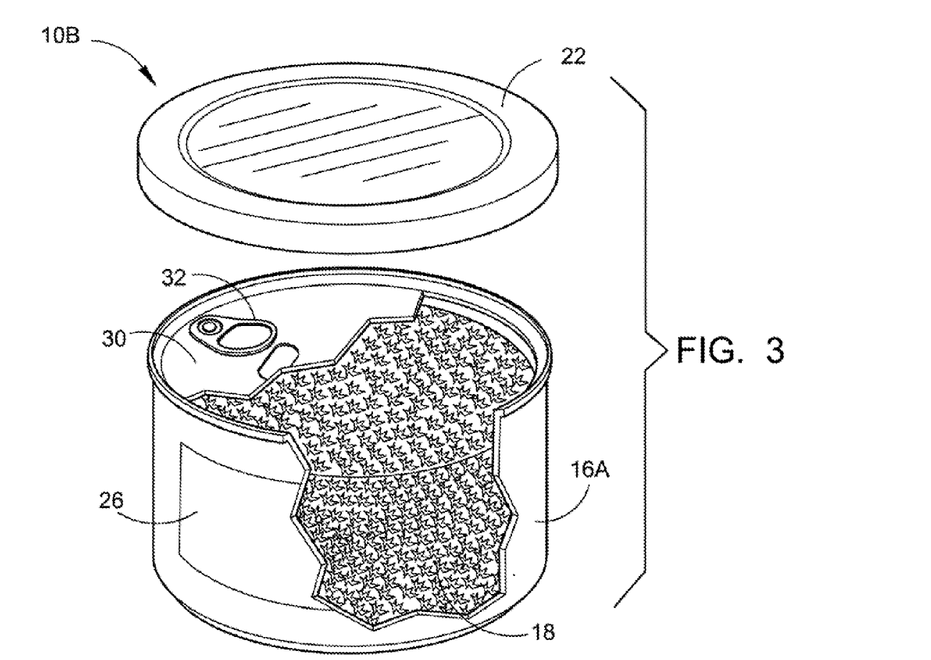
FIG. 3 depicts a perspective view of a tamper-resistant easy open container configured to contain a controlled substance and enable identification of the internal contents of such container cut away illustrating the container completely filled with the controlled substance with the plastic lid raised above.

FIG. 3 depicts a perspective view of a tamper resistant easy open container configured to contain a controlled substance and enable identification of the internal contents of such container 10B cut away illustrating the container completely filled with the controlled substance 18 with the plastic lid 22 above container 16A.

Figure 4:
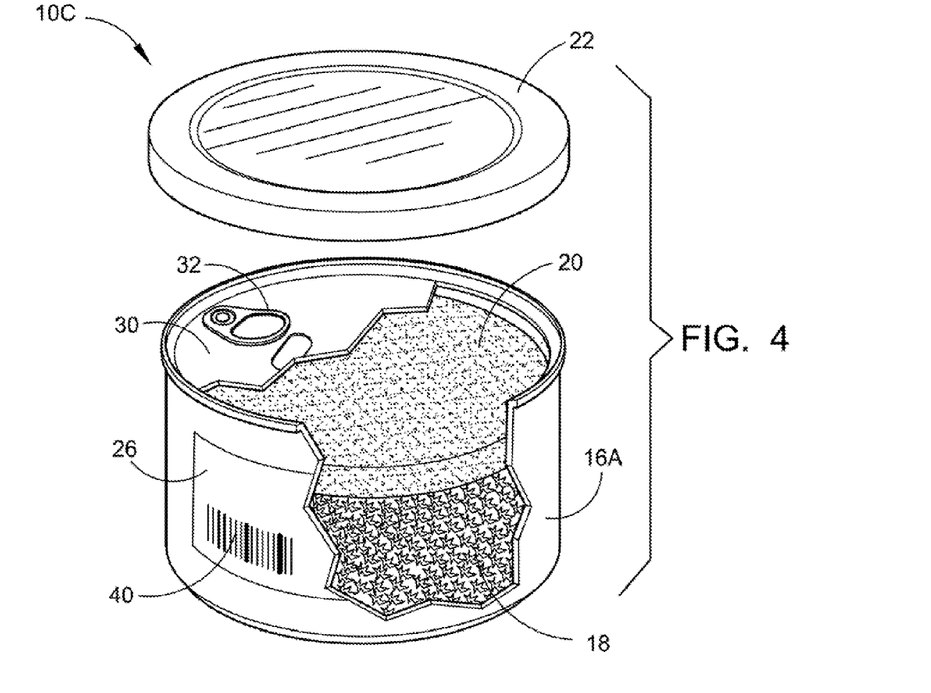
FIG. 4 depicts a perspective view of a tamper-resistant easy open container configured to contain a controlled substance and enable identification of the internal contents of such container cut away illustrating the controlled substance on the bottom of the container with a preformed rice cake on top with a barcode on the label and the plastic lid raised above.

FIG. 4 depicts a perspective view of a tamper resistant easy open container configured to contain a controlled substance and enable identification of the internal contents of such container 10C cut away illustrating the controlled substance 18 on the bottom of the container 16A with the upper preformed rice cake 20 with a barcode 40 on the label 26 and the plastic lid 22 above the container 16A.

Figure 5:
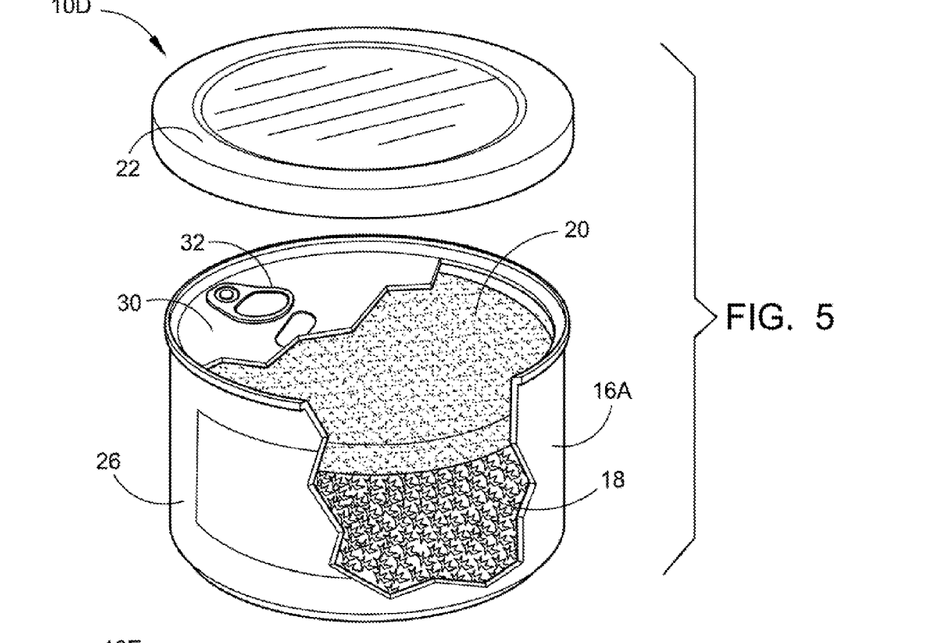
FIG. 5 depicts a perspective view of a tamper-resistant easy open container configured to contain a controlled substance and enable identification of the internal contents of such container cut away illustrating the controlled substance on the bottom of the container with a preformed rice cake on top and the plastic lid raised above.

FIG. 5 depicts a perspective view of a tamper resistant easy open container configured to contain a controlled substance and enable identification of the internal contents of such container 100 cut away illustrating the controlled substance 18 on the bottom of the container 16A with the upper preformed rice cake 20 on top and the plastic lid 22 above the container 16A.

Figure 6:
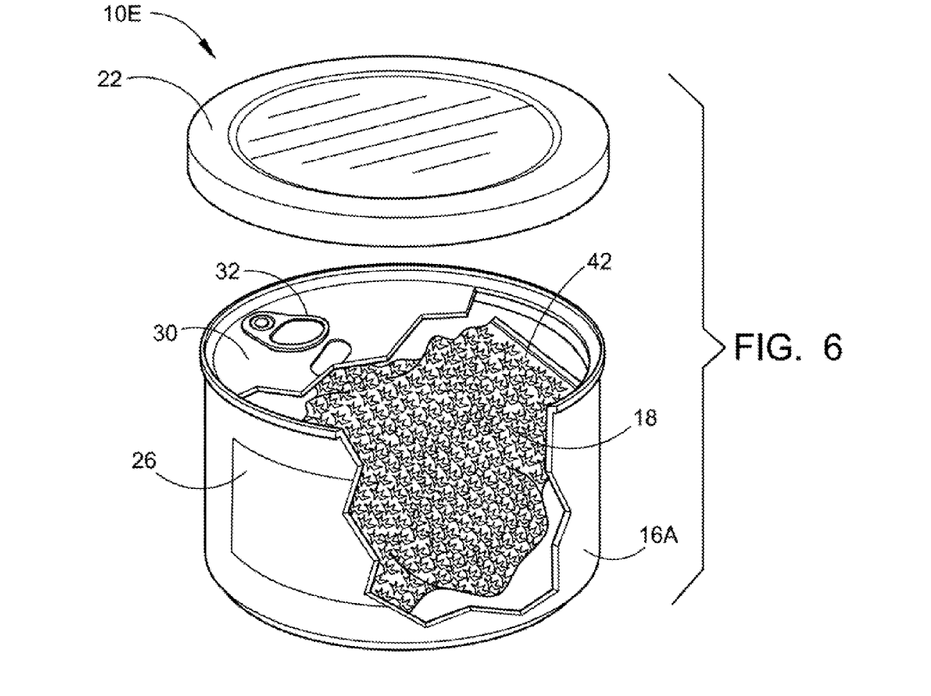
FIG. 6 depicts a perspective view of a tamper-resistant easy open sealed container configured to contain a controlled substance and enable identification of the internal contents of such container with the controlled substance in a sealed plastic bag.

FIG. 6 depicts a perspective view of a tamper resistant easy open sealed container configured to contain a controlled substance and enable identification of the internal contents of such container 10E with the controlled substance 18 in a sealed plastic bag 42.

Figure 7:
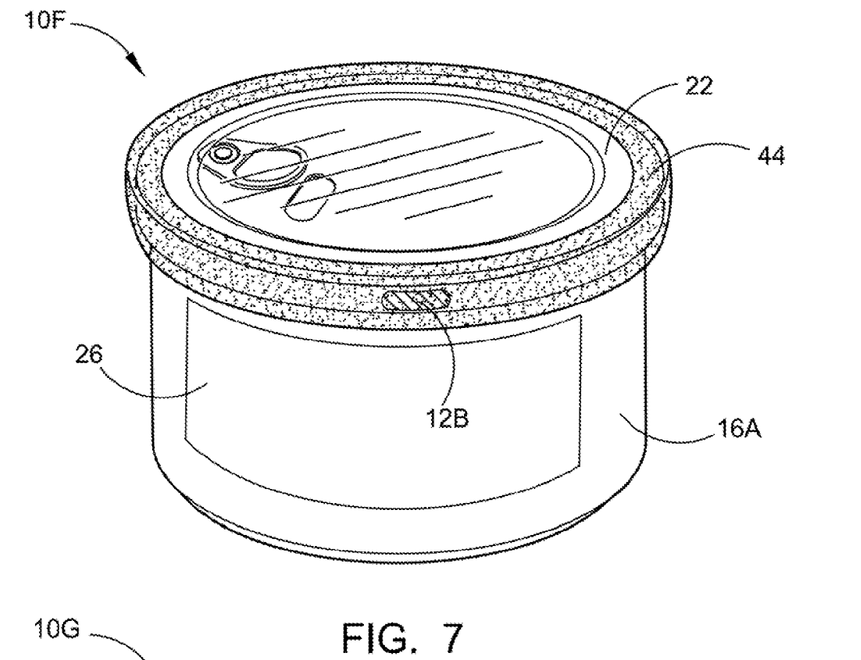
FIG. 7 depicts a perspective view of a tamper-resistant easy open sealed container configured to contain a controlled substance and enable identification of the internal contents of such container with the plastic removable locking ring incorporating a microchip.

FIG. 7 depicts a perspective view of a tamper resistant easy open sealed container configured to contain a controlled substance and enable identification of the internal contents of such container 10F with the plastic removable locking ring 44 over the plastic lid 22 and the top edge 34 of the container 16A incorporating the external microchip 12B.

Figure 8:
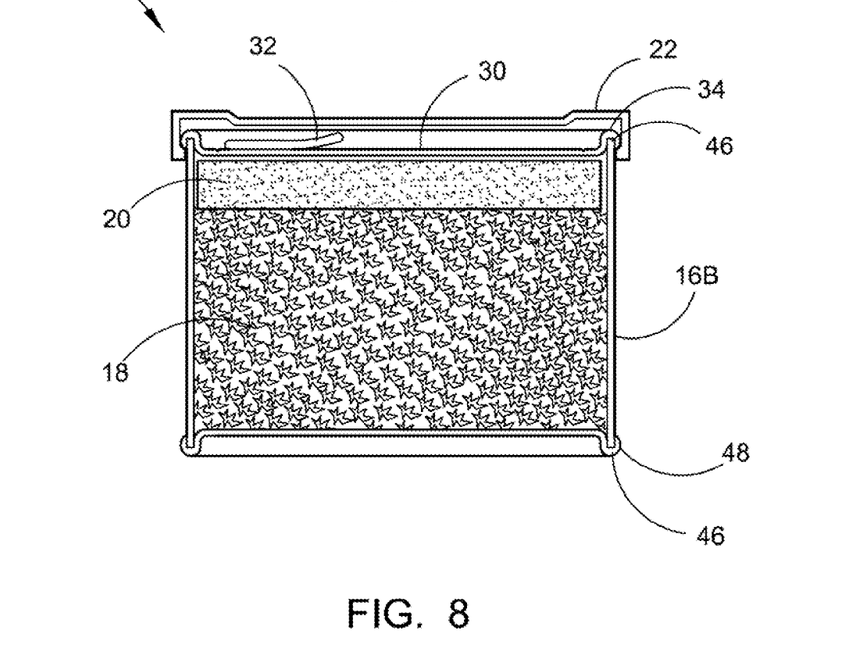
FIG. 8 depicts a cross section of a tamper-resistant easy open container configured to contain a controlled substance and enable identification of the internal contents of such container with a crimped edge on the bottom as well as the top. It should be understood that a conventional three-part tin (metal) can could be used, with or without a pop-top feature. This means that if a conventional three-part can is used without a tamper-resistant easy open "pop-top" feature, then it would necessitate a can opener be used to open the can to make the contents accessible.

FIG. 8 depicts a cross section of a three part tamper resistant easy open container configured to contain a controlled substance and enable identification of the internal contents of such container 10G with a crimped edge 46 on the container bottom edge 48 as well as the container top edge 34.

Figure 9:
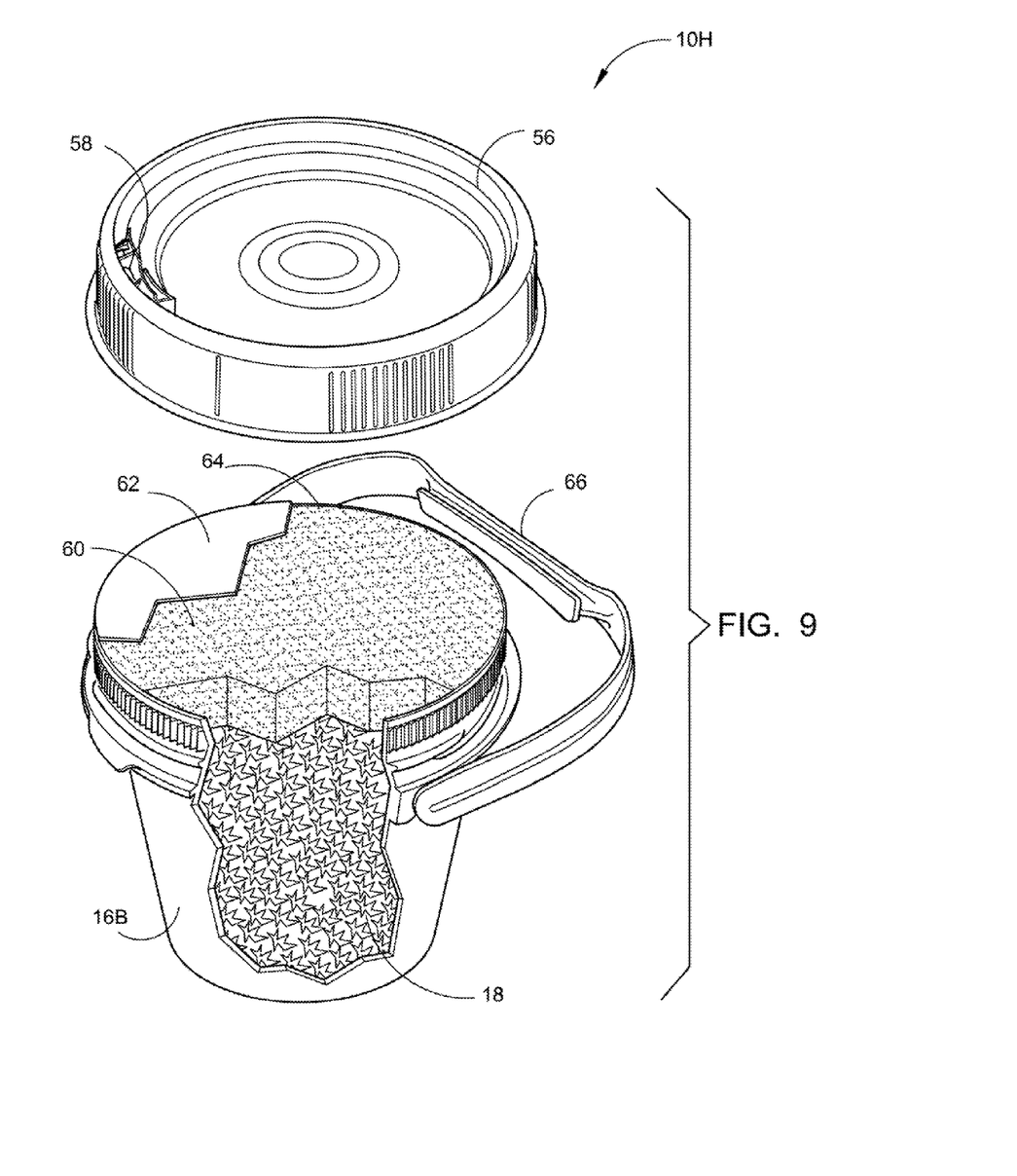
FIG. 9 depicts a perspective view of an alternate embodiment using a polymer round pail type of container having a lid that screws on with a ratcheting locking mechanism broken away illustrating the internal components.

FIG. 9 depicts a perspective view of an alternate embodiment 1011 of the process of canning a controlled substance in bulk amounts using a polymer round pail type of container 16B having a lid 56 that screws on with a ratcheting locking mechanism 58. The polymer round pail 16B has been broken away illustrating the controlled substance 18 and the rice cake packing material 60. The process of storing the controlled substance in an inert atmosphere is optional at this time. A film seal 62 covers the top surface attached to the pail edge 64. The polymer round pail 16B has a pivoting handle 66. This polymer round pail container 16B would be used for bulk controlled substance storage and transport.

Figure 10:
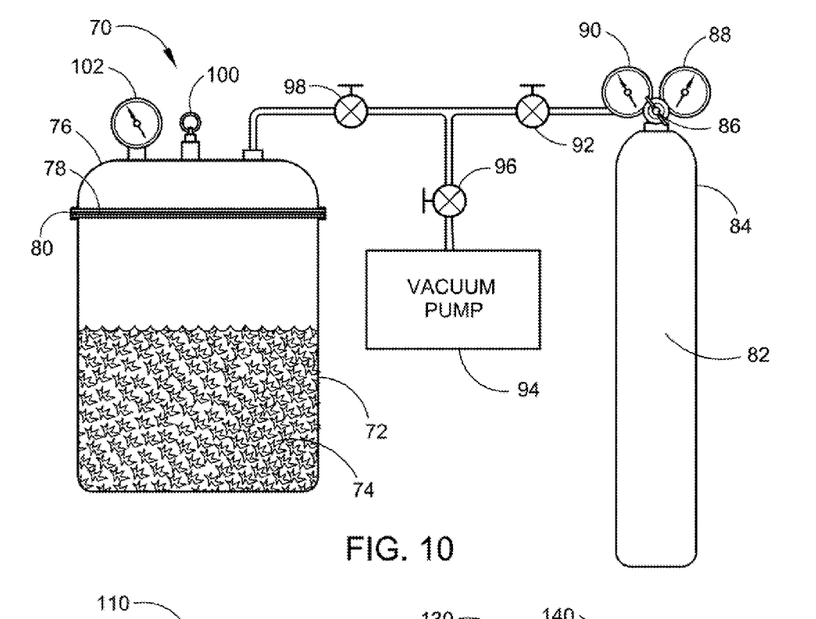
FIG. 10 illustrates a stand-alone specialized container and process for the storage, preservation, identification, tracking and transport of a federally controlled substance is disclosed herein for the storage and preservation of marijuana "trim" while it is collected and before it is processed to extract the active compound Tetrahydrocannabinols or THC.

FIG. 10 illustrates a stand-alone specialized container and process for the storage, preservation, identification, tracking and transport of a federally controlled substance is disclosed herein for the storage and preservation of Marijuana "trim" while it is collected and before it is processed to extract the active compound Tetrahydrocannabinols or THC. This stand-alone Marijuana trim storage system 70 includes a main holding container vessel 72 within which the Marijuana trim 74 is placed for storage until processed. The main container vessel 72 is equipped with a lid 76 which mates with the lid accepting portion 78 of the main container 72 and a gasket 80 to enable secure sealing of the lid 76 to the main container vessel 72. The main container vessel 72 is in communication with an inert gas source 82, here a compressed inert gas cylinder 84. The inert gas cylinder 84 is equipped with a regulator 86 including two pressure gauges 88 and 90. When the inert gas exits the regulator it is controlled by an on/off valve 92 located between the compressed gas cylinder 84 and the main container vessel 72.

Furthermore, the main container vessel 72 is in communication with a vacuum pump 94 and there is an on/off valve 96 in between the main container vessel 72 and the vacuum pump. Another on/off valve 98 is located before the vacuum pump 94 and the inert gas source 82 can communicate with the lid 76 of the main container. The lid also includes a pressure relief valve 100 and a vacuum gauge 102. The stand-alone Marijuana trim storage system 70 main container vessel 72 can be placed in a refrigeration unit or the main container vessel 72 can be equipped with refrigeration coils (not shown).

The storage and preservation of Marijuana trim is accomplished through this stand-alone Marijuana trim storage system 70. During the growing and harvesting of marijuana, the plant is "pruned" in the effort to enhance the "bud", the most desirable part of the plant. This pruning generates what is referred to as "Trim." When enough trim has been accumulated, it is then washed with solvents to liberate the THC that is in the leaves, the solvents are removed and liquid THC remains. This liquid is used in the baking of edible products (i.e. cookies, brownies, small cakes, etc.). The problem the industry has to combat is keeping the trim fresh until enough has been accumulated to make processing viable. The present stand-alone Marijuana trim storage system 70 for trim storage that consists of an airtight main container vessel 72 that can be opened easily, filled with trim, and then a vacuum is applied (26-28 inches of mercury) to boil off atmospheric moisture and remove the oxygen. After evacuation, the main container vessel 72 is then filled with dry, inert gas, preferably nitrogen. This process stabilizes and preserves the trim for processing. In addition, this vessel can be refrigerated to 36-40 degrees Fahrenheit to further slow degradation of the contents.

Figure 11:
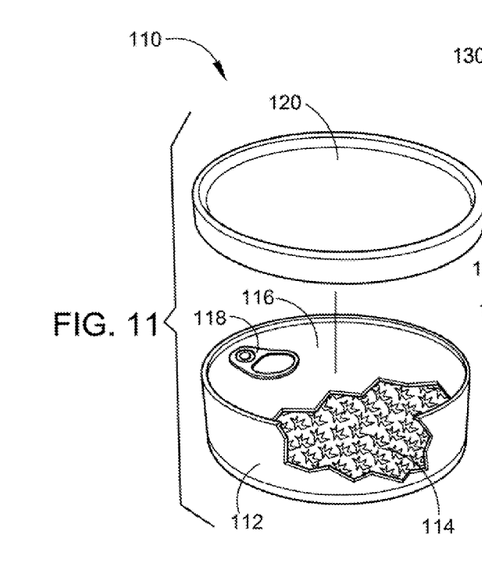
FIG. 11 depicts a single tamper resistant easy open container representing one of the containers removed from a shrink-wrapped four pack, wherein said four pack of tamper resistant easy open containers is shown in FIG. 12.
Figure 12:
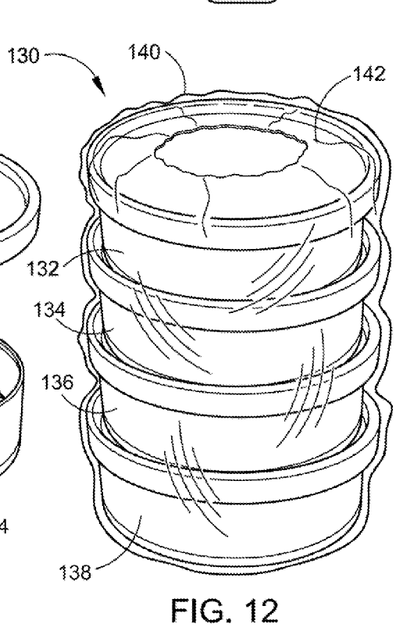
FIG. 12 depicts a four pack of single tamper resistant easy open containers meant for the storage, preservation, identification, tracking and transport of a federally controlled substance in small quantities, all being shrink-wrapped into one pack of four containers.

FIG. 11 depicts a single tamper resistant easy open container 112 representing one of the containers removed from a four pack, wherein said for pack of tamper resistant easy open containers is shown in FIG. 12. The single tamper resistant easy open container 112 has been filled with a federally controlled substance 114, and includes a tamper resistant easy open lid 116 (in this case showing a pop-top ring 118 for easy opening). A plastic removable lid 120 is also provided to replace the tamper resistant easy open lid 116 after it is removed to keep the contents fresh. The tamper resistant lid 116 including the pull top 118 lid is a tamper resistant safety feature. If the seal is breached, it can't be returned to its sealed condition giving the consumer a tell-tale indication that the product has possibly been tampered with or compromised. Child proof lids can be opened and returned to a sealed condition, not leaving a tell-tale sign, thus pilferage and possible compromised product will go undetected. A pull top lid is a one-time use only feature.

FIG. 12 depicts a four pack of single tamper resistant easy open containers 130 meant for the storage, preservation, identification, tracking and transport of a federally controlled substance in small quantities, all being shrink wrapped into one pack of four 130. Each of the four cans 132, 134, 136 and 138 is held tightly and securely together by plastic shrink wrapping 140. Each of the four cans 132, 134, 136 and 138 also includes a plastic lid 142.

Small quantity usage is pervasive in federally controlled substances of all kinds. Because of the varying availability of packaging sizes, consumers are able to only open and expose small amounts of product at a time, thus eliminating the exposure of the product inside to the elements. This allows the consumer to keep and store their products for longer periods of time instead of utilizing them in a shorter period of time because of the shorter shelf life of exposed product. For example, with Marijuana: An eighth of an ounce of marijuana fits neatly into a nitrogen packed container, which is approximately the same size as a typical container of chewing tobacco. A plastic over cap is applied to the containers. Four of these containers are stacked and held together by a plastic shrink sleeve 140. While the total amount of Marijuana in possession (in those US states which have legalized it) is currently ½ ounce, only a $\frac{1}{8}^{th}$ ounce is exposed to the elements at any given time. The other $\frac{3}{8}^{th}$ ounce is sealed and stored tightly in the remaining containers, and stays as fresh as when it was first introduced into the containers for storage and preservation. All containers come with a pull top tamper resistant lid 116 (as shown in FIG. 11) affixed.

Figure 13:
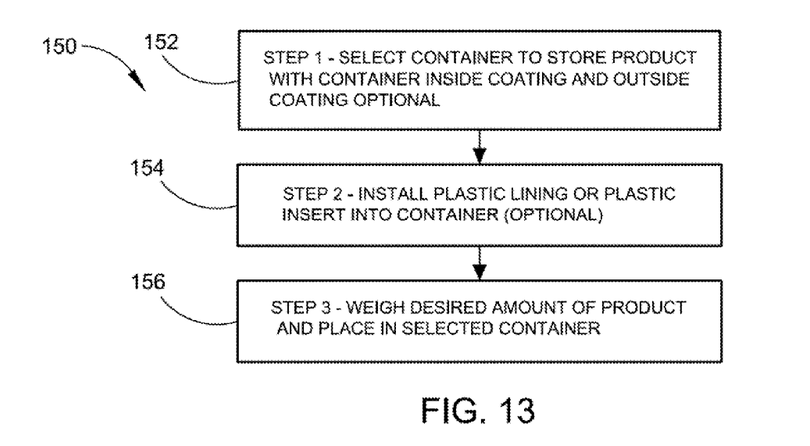
FIG. 13 illustrates a flow chart of the first three steps in the process for the storage, preservation, identification, tracking and transport of a federally controlled substance.

FIG. 13 illustrates a flow chart of the first three steps in the process 150 for the storage, preservation, identification, tracking and transport of a federally controlled substance. Step 1 152 includes the proper size container is selected to store the marijuana, a container that fits the portion to be processed. The container can be a metal/tin can with a vinyl or enamel coating inside. A coated container is preferred. This coating will shield the product from coming in contact with the bare metal of the can and possibly reacting with the metal. The outside of the container could be coated with either a vinyl or an epoxy to prevent rust.

A plastic lined can is preferred, to include but not limited to a plastic lining or coating on the inside of the can to protect the product from coming in contact with bare metal/tin and causing a reaction, for example, transfer of a metallic taste to the product and/or having moist product coming in direct contact with any metal material.

Step 2 154 includes a plastic lining or insert can be installed, this coating or lining will shield against the product coming in contact with the bare metal of the can, and possibly reacting with the metal. Containers can also be made of composite material, (a composite can), a plastic can, a plastic pail or a plastic bucket.

Step 3 156 includes the product, (in this example, marijuana), is then weighed and placed in the can, or weighed in the can, (minus the tare weight of the can).

Figure 14:
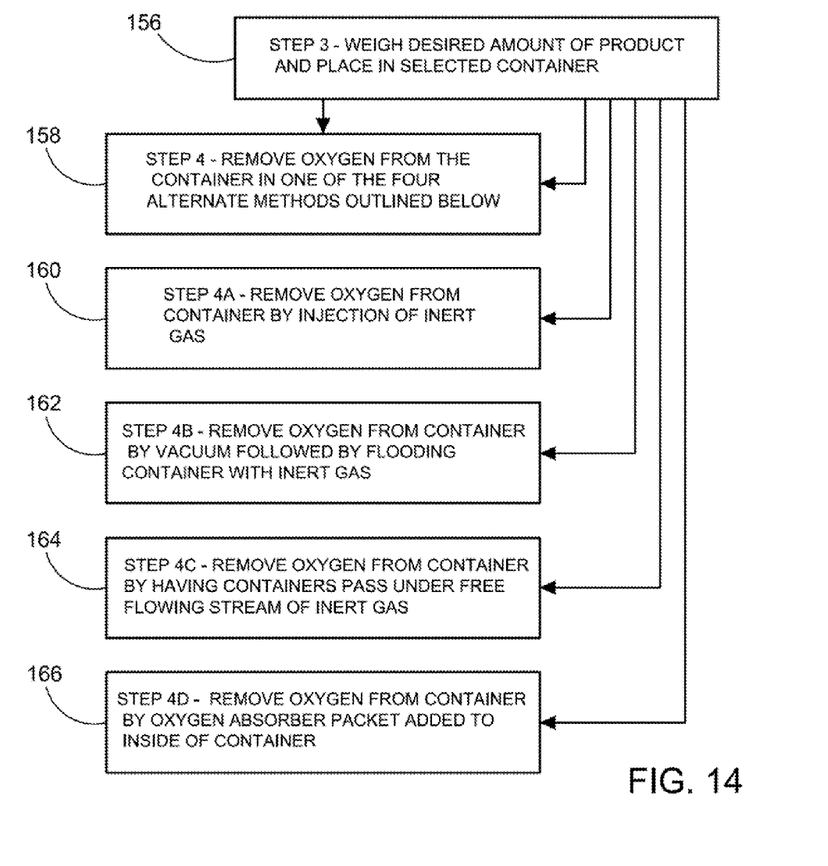
FIG. 14 illustrates a flow chart of the last two steps in the process for the storage, preservation, identification, tracking and transport of a federally controlled substance.

FIG. 14 illustrates a flow chart of the last two steps in the process 150 for the storage, preservation, identification, tracking and transport of a federally controlled substance. Here again, Step 3 156 includes the product, (marijuana), is then weighed and placed in the can, or weighed in the can, (minus the tare weight of the can). Following Step 3 156, Step 4 158 includes the can or container is now run through a process to remove the oxygen from the container. This is accomplished through the use of inert gases, to include but not limited to the insertion of liquid or gaseous inert gases, i.e. nitrogen, carbon dioxide, helium etc., to create a benign, dry, non-reactive atmosphere inside the can to stabilize and preserve the product.

This is achieved in one of four alternative method steps as described below;

Method Step 4A 160 includes removing the oxygen by having the can/container pass under a system that injects inert liquid gas (nitrogen preferred). The liquid is cold and dense. It immediately begins to gasify, thus displacing the atmospheric oxygen from the can/container. Before the gasification is complete, the can is sealed with a "pop top" lid and a seam is completed, leaving a nitrogen atmosphere inside the can/container.

This process can also be achieved by Step 4B 162 by placing the can, or cans, or containers, in a vacuum chamber, evacuating the chamber and then flooding the chamber with gaseous nitrogen or any inert gas, then quickly sealing (seaming) the cans before the colder dense gas warms and tries to escape.

A third method of replacing the oxygen is shown in Step 4C 164 which is to allow the filled cans to pass under a free falling, free flowing stream of nitrogen as it travels to the machine to be lidded and seamed. In lieu of injecting a measured quantity of liquid nitrogen in to the can as it moves toward the lidder/seamer, it is now replaced with just passing under a falling stream of cold, dense nitrogen. This achieves an oxygen removal displacement. This method is effective but allows much of the nitrogen to be wasted in the surrounding area.

A fourth method, as illustrated in Step 4D 166 would be to place an oxygen absorber packet inside the can prior to lidding. This will turn the available oxygen inside the can into iron oxide, thus effectively removing the oxygen in the can/container.

In summary, there are four basic configurations in which the federally controlled substances could be canned, (1) canned loosely alone with no spacer or insert; (2) canned with only a top spacer or insert; (3) canned with both a top and bottom spacer or insert, and (4) canned pre-packaged in a sealed plastic bag or foil envelope. Finally, bulk amounts of controlled substances could be stored and transported in large sealed polymer pails, with and without spacers or inserts.

Furthermore, in summary, in the process of canning the federally controlled substances for long term storage and maximized preservation, the oxygen is removed from the container during the process in one of four ways: (1) injection into the container of inert gas before sealing the container; (2) flooding the container with inert gas before sealing the container; (3) passing the container under a free flowing stream of inert gas before sealing the container; and (4) addition of an oxygen absorber packet into the container before sealing the container.

Moreover, it is anticipated that many other federally controlled substances such as pharmaceuticals will be stored, preserved, identified, tracked and transported using the present invention and inventive method. This is to include but not limited to using the same process for other drugs, pills, powders, and liquids to stabilize and preserve, giving them a longer shelf life. (Some medications degrade rapidly in the presence of atmospheric moisture, oxygen, and light.) This process is to include possible refrigeration of the cans to slow degradation of the products inside, in some cases even freezing the canned product. In the case of marijuana, low temperatures are desirable, but freezing will harm the product.

In addition, the present invention is directed at solving problems in scent detection and/or scent suppression for containers of federally controlled substances. Depending on the desired situation, when properly filled, no marijuana is allowed to come in contact with the outside of the container, and when properly sealed, the product cannot be detected by drug-sniffing dogs. If detection is desired, the container simply needs to come in contact with the marijuana on the outside of the container. The scent lingers and drug sniffing dogs can detect/locate the product. Alternatively, the previously described label having an odor adhered portion can be employed to enhance the detection of the federally controlled substance contents within the container so labeled.

Further, the purpose of the foregoing abstract is to enable the US Patent and Trademark Office and the public generally, and especially the scientists, engineers an practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A container for storage, preservation, identification, tracking and transport of a federally controlled substance comprising:
   (a) a one or more piece airtight container having an outer portion having an exterior surface and an inner portion having an interior surface, an upper portion and a lower portion, configured for containing a federally controlled substance;
   (b) an inner coating liner lining said inner portion interior surface of said airtight container;
   (c) a one piece tamper resistant easy open lid affixed to said upper portion of said airtight container, wherein said easy open lid includes an inner surface and an outer surface, and further wherein said easy open lid inner surface includes an inner coating liner lining said inner surface; and
   (d) identifying indicia located on the outer portion exterior surface of said airtight container, for identifying the contained federally controlled substance contents within said container, wherein said identifying indicia located on said outer portion exterior surface for identifying the contained federally controlled substance contents within said container includes a label having a portion where an external odor from a federally controlled substance is adhered;
   wherein said airtight container configured for containing a federally controlled substance, has the atmosphere evacuated before said airtight container is hermetically sealed, containing a federally controlled substance inside said airtight hermetically sealed lined container in a preserving storage environment until said hermetically sealed airtight lined container is opened.

2. The container for storage, preservation, identification, tracking and transport of a federally controlled substance according to claim 1, wherein said one or more piece airtight container includes a plastic coating lined metal container.

3. The container for storage, preservation, identification, tracking and transport of a federally controlled substance according to claim 1, wherein said one or more piece airtight container includes a plastic lined composite container.

4. The container for storage, preservation, identification, tracking and transport of a federally controlled substance according to claim 1, wherein said one piece tamper resistant easy open lid affixed to said airtight container includes a pop-top one piece tamper resistant easy open lid.

5. The container for storage, preservation, identification, tracking and transport of a federally controlled substance according to claim 1, wherein said container comprises a polymer round pail and said one piece tamper resistant easy open lid affixed to said airtight container includes an airtight screw-on lid.

6. The container for storage, preservation, identification, tracking and transport of a federally controlled substance according to claim 1, wherein said external odor from a federally controlled substance is adhered during the container controlled substance filling process, for the purpose of allowing federal agencies, drug-sniffing dogs, and others to detect the presence of the federally controlled substance contents contained therein.

7. The container for storage, preservation, identification, tracking and transport of a federally controlled substance according to claim 1, wherein said identifying indicia is located within said inner portion of said airtight container and comprises a microchip.

8. A method for making a container for the storage, preservation, identification, tracking and transport of a federally controlled substance, comprising the steps of:
   (a) providing a one or more piece airtight container having an outer portion having an exterior surface and an inner portion having an interior surface, an upper portion and a lower portion, configured for containing a federally controlled substance;
   (b) providing an inner coating liner lining said inner portion interior surface of said airtight container;
   (c) providing a one piece tamper resistant easy open lid affixed to said upper portion of said airtight container, wherein said easy open lid includes an inner surface and an outer surface, and further wherein said easy open lid inner surface includes an inner coating liner lining said inner surface; and
   (d) providing identifying indicia located on the outer portion exterior surface of said airtight container, for identifying the contained federally controlled substance contents within said container, wherein said identifying indicia located on said outer portion exterior surface for identifying the contained federally controlled substance contents within said container includes a label having a portion where an external odor from a federally controlled substance is adhered;
   wherein said airtight container configured for containing a federally controlled substance, has the atmosphere evacuated before said airtight container is hermetically sealed, containing a federally controlled substance inside said airtight hermetically sealed lined container in a preserving storage environment until said hermetically sealed airtight lined container is opened.

9. The method for making a container for the storage, preservation, identification, tracking and transport of a federally controlled substance, according to claim 8, wherein said one or more piece airtight container includes a plastic coating lined metal container.

10. The method for making a container for the storage, preservation, identification, tracking and transport of a federally controlled substance, according to claim 8, wherein said one or more piece airtight container includes a plastic lined composite material container.

11. The method for making a container for the storage, preservation, identification, tracking and transport of a federally controlled substance, according to claim 8, wherein said one piece tamper resistant easy open lid affixed to said airtight container includes a pop-top one piece tamper resistant easy open lid.

12. The method for making a container for the storage, preservation, identification, tracking and transport of a federally controlled substance, according to claim 8, wherein said container comprises a polymer round pail and said one piece tamper resistant easy open lid affixed to said airtight container includes an airtight screw-on lid.

13. The method for making a container for the storage, preservation, identification, tracking and transport of a federally controlled substance, according to claim 8, wherein said external odor from a federally controlled substance is adhered during the container controlled substance filling process, for the purpose of allowing federal agencies, drug-sniffing dogs, and others to detect the presence of the federally controlled substance contents contained therein.

14. The method for making a container for the storage, preservation, identification, tracking and transport of a federally controlled substance, according to claim 8, wherein said identifying indicia is located within said inner portion of said airtight container and comprises a microchip.

15. The method for making a container for the storage, preservation, identification, tracking and transport of a federally controlled substance, according to claim 8, wherein said airtight container configured for containing a federally controlled substance, has the atmosphere evacuated and the container filled with an inert gas before the airtight container is hermetically sealed, containing a federally controlled substance inside, further includes removing the oxygen from said airtight container by injection of inert gas prior to sealing said airtight container.

16. The method for making a container for the storage, preservation, identification, tracking and transport of a federally controlled substance, according to claim 8, wherein said airtight container configured for containing a federally controlled substance, has the atmosphere evacuated and the container filled with an inert gas before the airtight container is hermetically sealed, containing a federally controlled substance inside, further includes removing the oxygen from said airtight container by flooding said airtight container with inert gas prior to hermetically sealing said airtight container.

17. The method for making a container for the storage, preservation, identification, tracking and transport of a federally controlled substance, according to claim 8, wherein said airtight container configured for containing a federally controlled substance, has the atmosphere evacuated and the container filled with an inert gas before the airtight container is hermetically sealed, containing a federally controlled substance inside, further includes removing the oxygen from said airtight containers by having passing said containers under a free flowing stream of inert gas prior to hermetically sealing said airtight container.

18. The method for making a container for the storage, preservation, identification, tracking and transport of a federally controlled substance, according to claim 8, wherein said airtight container configured for containing a federally controlled substance, has the atmosphere evacuated and the container filled with an inert gas before the airtight container is hermetically sealed, containing a federally controlled substance inside, further includes removing the oxygen from said airtight container by inclusion of an oxygen absorber packet prior to hermetically sealing said airtight container.

* * * * *